(12) United States Patent
Polk

(10) Patent No.: US 8,885,206 B2
(45) Date of Patent: Nov. 11, 2014

(54) DIRECT-TO-PRODUCT TRANSFER OF PERSONALIZED IMAGES AND TRACKING LABELS USING A SINGLE COMPOSITE IMAGE

(75) Inventor: Michael Lane Polk, Mint Hill, NC (US)

(73) Assignee: Fujifilm North America Corporation, Valhalla, CA (US)

( * ) Notice: Subject to any disclaimer, the term of this patent is extended or adjusted under 35 U.S.C. 154(b) by 189 days.

(21) Appl. No.: 13/551,326

(22) Filed: Jul. 17, 2012

(65) Prior Publication Data

US 2014/0022567 A1    Jan. 23, 2014

(51) Int. Cl.
*G06K 15/00* (2006.01)
*H04N 1/00* (2006.01)

(52) U.S. Cl.
USPC .......................................... 358/1.18; 358/1.6

(58) Field of Classification Search
None
See application file for complete search history.

(56) References Cited

U.S. PATENT DOCUMENTS

| | | | |
|---|---|---|---|
| 5,514,860 A | 5/1996 | Berson | |
| 6,299,212 B1 * | 10/2001 | DeJoseph et al. | 283/80 |
| 6,644,764 B2 | 11/2003 | Stephens, Jr. | |
| 6,902,265 B2 | 6/2005 | Critelli et al. | |
| 7,191,336 B2 | 3/2007 | Zeller et al. | |
| 7,751,069 B2 * | 7/2010 | Wen et al. | 358/1.12 |
| 7,963,437 B1 * | 6/2011 | McBride et al. | 235/101 |
| 8,733,868 B1 * | 5/2014 | Polk et al. | 347/4 |
| 2004/0088187 A1 * | 5/2004 | Chudy et al. | 705/2 |
| 2009/0210341 A1 * | 8/2009 | Rathbun et al. | 705/39 |

OTHER PUBLICATIONS

InData Systems, A whitepaper on: Invisible and Fluorescing Bar Code Printing and Reading, Important technical considerations that are the key to successful implementations, Version 1.03, www.uvreaders.com, dated Feb. 17, 2011, 12 pages.

\* cited by examiner

*Primary Examiner* — Dov Popovici
(74) *Attorney, Agent, or Firm* — Blakely, Sokoloff, Taylor & Zafman LLP

(57) ABSTRACT

The printing tracking labels as a part of a composite image of personalized images for photo products includes receiving a plurality of personalized images and a plurality of label images, each label image including order tracking information associated with one of the plurality of personalized images. A composite image including the plurality of personalized images and the plurality of label images is generated. The position of each personalized image within the composite image corresponds to a position of a separate photo product on a printer tray and the position of each label image within the composite image corresponds to a position of a separate label on the printer tray. The composite image is printed onto the plurality of photo products and the plurality of labels.

14 Claims, 5 Drawing Sheets

DIRECT-TO-PRODUCT TRANSFER OF PERSONALIZED IMAGES AND TRACKING LABELS USING A SINGLE COMPOSITE IMAGE

FIELD

Embodiments of the present invention relate generally to the field of image transfer. In particular, embodiments of the present invention relate to direct-to-product printing of tracking labels as a part of a composite image of personalized images for photo products.

BACKGROUND

Direct-to-product printing is a process of transferring a digital image to a product using an inkjet printer to adhere ink directly to a product. The product may include wood, glass, ceramic, metal, plastic, or another material that is compatible with the ink. For example, a personalized photo product such as an ornament may be created by printing a personalized image on the ornament.

Direct-to-product printing may be used by a business to generate personalized photo products for customers. With products that include unique and personal images, there is a need to make certain that each product is shipped or otherwise delivered to the correct customer. As greater numbers of personalized photo products are printed (e.g., in mass production of products including unique images), the occurrences of shipping a personalized photo product to the wrong customer increases due to incorrectly matching the shipping labels to the product.

SUMMARY

A method for printing tracking labels as a part of a composite image of personalized images for photo products is described. In one embodiment, the method includes receiving a plurality of personalized images and a plurality of label images. Each label image includes order tracking information associated with one of the plurality of personalized images. The method further includes generating the composite image including the plurality of personalized images and the plurality of label images. The position of each personalized image within the composite image corresponds to a position of a separate photo product on a printer tray and the position of each label image within the composite image corresponding to a position of a separate label on the printer tray. The method further includes printing the composite image onto the plurality of photo products and the plurality of labels on the printer tray, each personalized image printed on a photo product and each label image printed on a label.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements, and in which.

DETAILED DESCRIPTION

A method and apparatus for printing tracking labels as a part of a composite image of personalized images for photo products are described. In the process of transferring unique or personalized digital images to specialty products (referred to herein as photo products), a manufacturer may produce great numbers of unique or personalized photo products. For example, a composite image may be used to print a dozen or more personalized photo products in a single print cycle. Each customer order, however, may include as few as only one personalized photo product and each photo product may be unique amongst the remainder of personalized photo products. Unlike the mass manufacturing of nearly identical products, tracking each individual photo product and shipping it to the correct customer is of great importance. Printing tracking information directly onto the photo product, however, would detract from the appearance of the photo product. Printing to both the photo products and separate corresponding tracking labels within the same print cycle, with the labels in close physical proximity to corresponding photo products, reduces the likelihood of mislabeling each photo product without altering the appearance of the photo product. A neighboring label can be removed from the printer tray and placed on the photo product (e.g., temporarily) or on packaging or a container for the photo product, providing customer or shipping information for that photo product and thereby reducing the likelihood of shipping a personalized photo product to the wrong customer.

Figure 1:
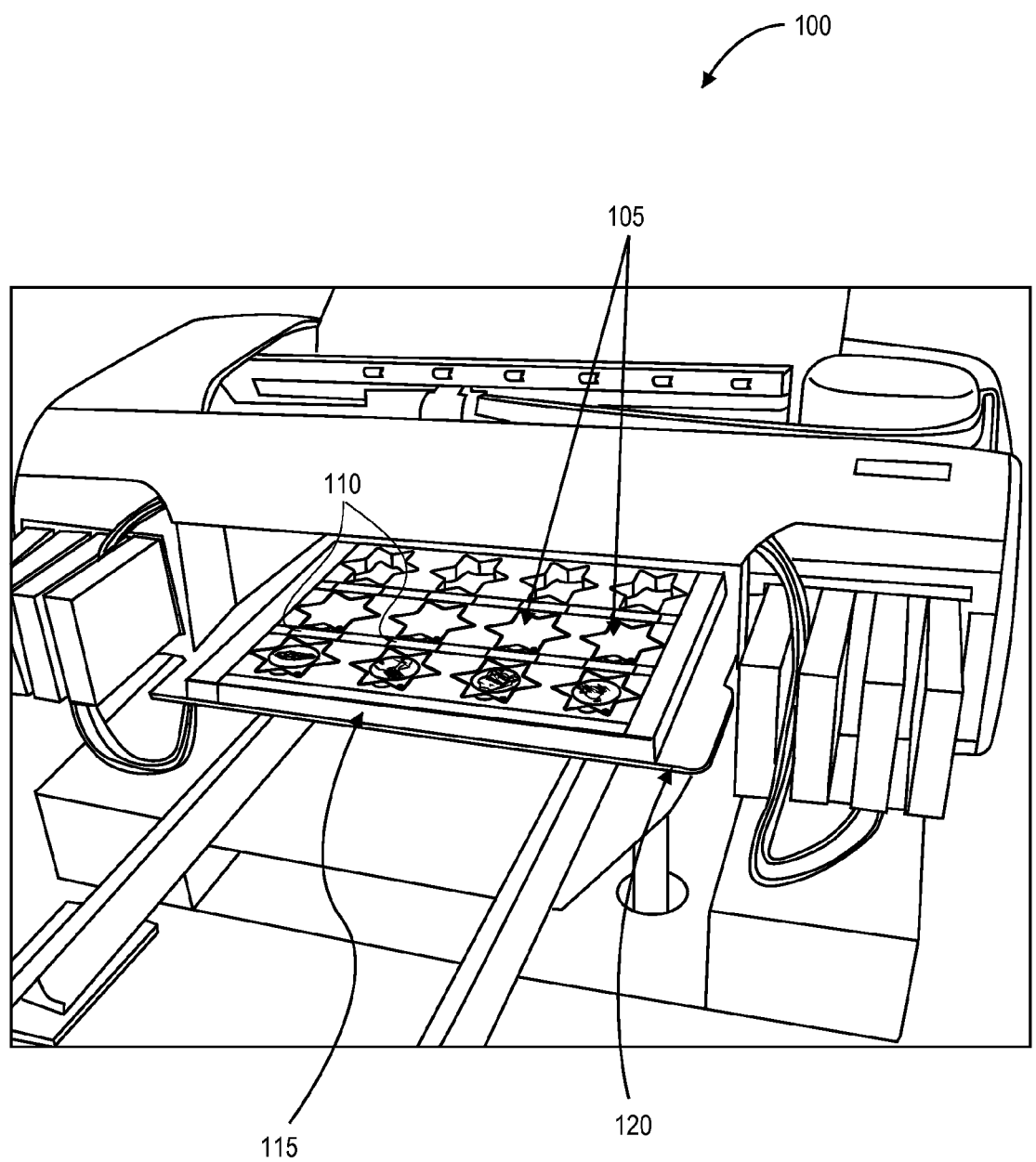
FIG. 1 illustrates a perspective view of an exemplary direct-to-product printer for printing to photo products and labels on a printer tray.

FIG. 1 illustrates a perspective view of an exemplary direct-to-product printer 100 for printing to photo products 105 and labels 110 on a printer tray 115. In one embodiment, the printer 100 is a flatbed inkjet printer that uses multiple (e.g., eight) individual inks. In one embodiment, the printer 100 includes a flatbed platter or "platen" 120 to secure the printer tray 115. The flatbed platter 120 may move along one or more axes to position the photo products 105 and labels 110 to be printed. In one embodiment, the printer head (not shown) of the printer 100 and flatbed platter 120 collectively move along three (x, y, and z) axes. For example, the flatbed platter 120 may move along an x axis, the printer head may move along a y axis, and the flatbed platter 120 may also be adjustable or move along a z axis. An embodiment that allows movement along a z axis enables adjustments for trays and/or photo products of different heights (as compared to the height of the printer head).

In one embodiment, the printer 100 is coupled to a data processing system, such as the data processing system described below with reference to FIG. 5. The data processing system may transmit image and print command data to the printer 100 over a wired or wireless connection to cause the printer 100 to print personalized images to the photo products 105 and tracking labels to the labels 110. In an alternate embodiment, such a data processing system may be incorporated within the printer 100 and receive image and tracking data.

Figure 2:
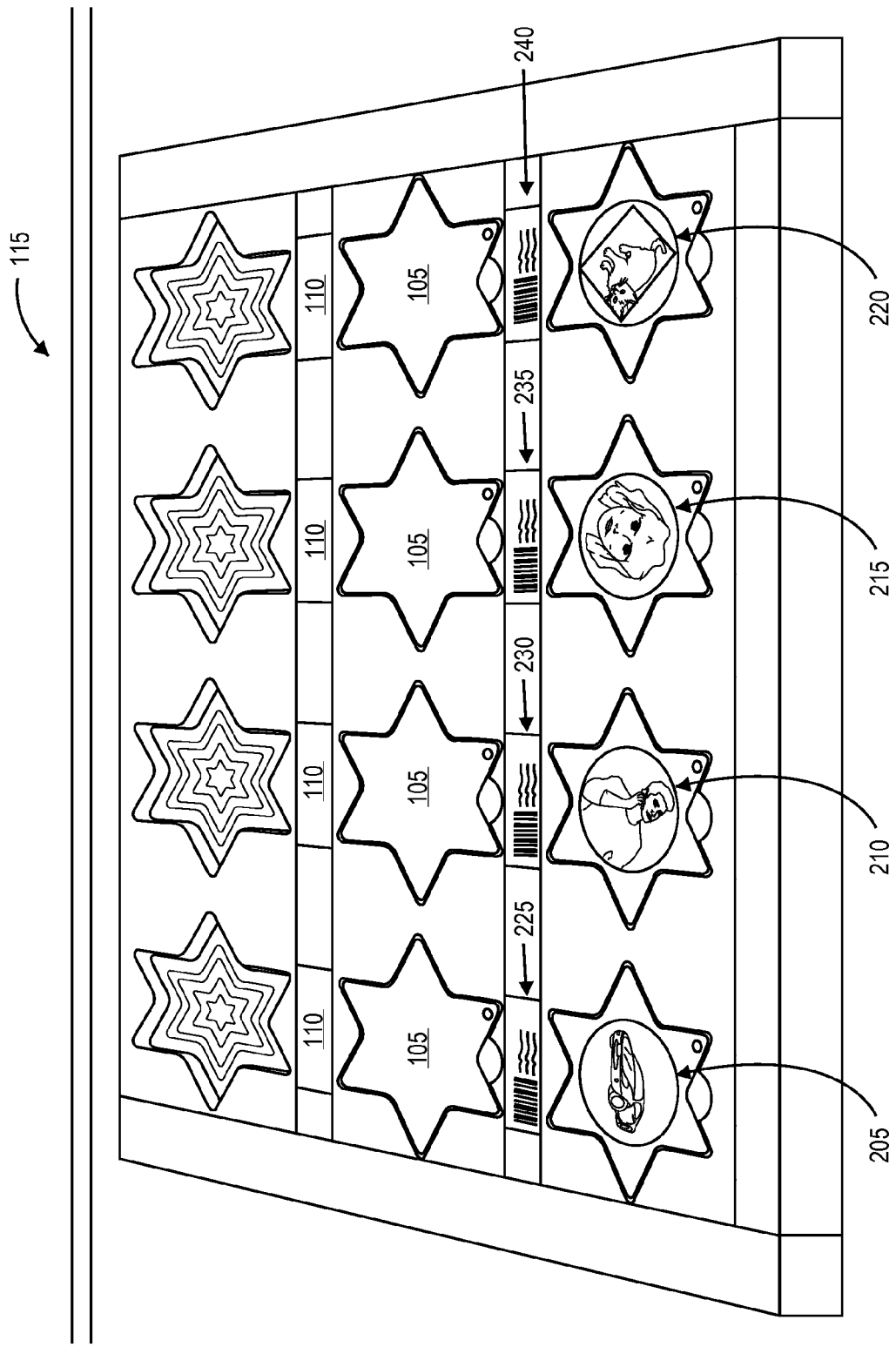
FIG. 2 shows a perspective view of the printer tray illustrated in FIG. 1.

FIG. 2 shows a perspective view of the printer tray 115 illustrated in FIG. 1. In one embodiment, the photo products 105 and the labels 110 are separate items. The tracking information for each photo product is printed onto a label 110 and not directly onto the photo product 105. In the illustrated exemplary embodiment, the printer tray 115 holds rows of star-shaped photo products 105 and, in between the rows of photo products 105, rows of labels 110. In one embodiment, alternating rows of photo products 105 and labels 110 enables a printed photo product 105 to be in close physical proximity to a corresponding printed label 110. The possibility of mislabeling or losing track of the photo product 105 is reduced by printing tracking information on a neighboring label 110. A person or automated system may easily match corresponding photo products 105 and labels 110 as a print cycle completes.

To illustrate the embodiments described herein, only one row of photo products 105 has been printed with personalized images 205, 210, 215, and 220, and only one row of labels 110 has been printed with tracking information 225, 230, 235, and 240. Additionally, at least one row of photo products 105 and one row of labels 110 have been illustrated without being printed. According to the embodiments set forth herein, multiple rows of photo products 105 and multiple rows of labels 110 may be printed in a single print cycle. As used herein, a single print cycle refers to the printer 100 transferring a single composite image onto photo products 105 and labels 110.

Each of the personalized images 205, 210, 215, and 220 corresponds respectively to the tracking information 225, 230, 235, and 240. Once printed, a label 110 can be used to track or indicate shipping information for a corresponding photo product 105. For example, the photo product 105 printed with a personalized image 205 corresponds to the neighboring label 110 printed with tracking information 225. The label 110 with tracking information 225 may be removed and affixed (e.g., via an adhesive) to the photo product 105 printed with the personalized image 205 or to a container (not shown) that will store and/or be used to ship the photo product 105 printed with the personalized image 205.

Figure 3:
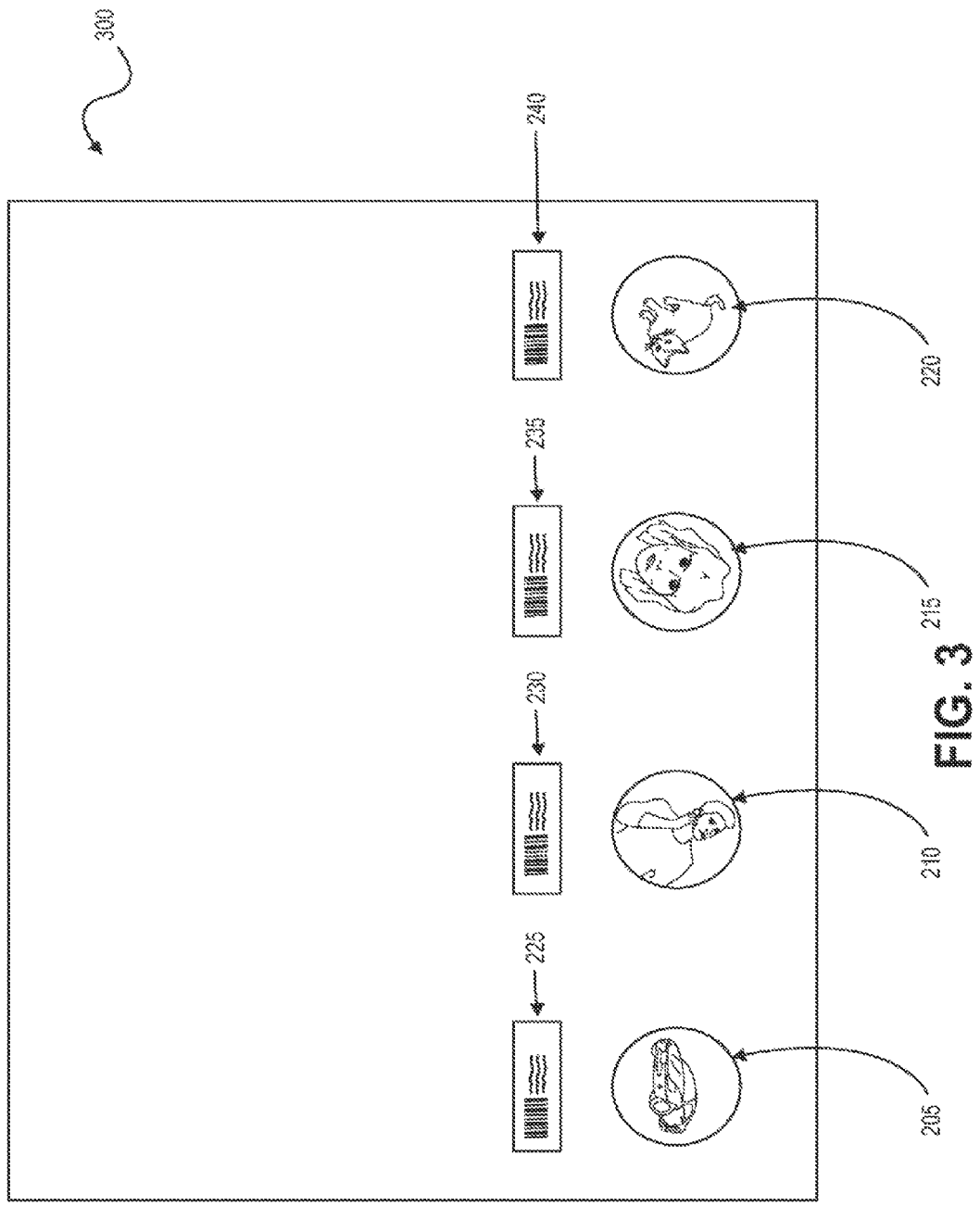
FIG. 3 illustrates an exemplary composite image according to an embodiment of the invention.

FIG. 3 illustrates an exemplary composite image 300 according to an embodiment of the invention. In one embodiment, each personalized image 205, 210, 215, and 220 is associated with a customer order. For example, a customer may select a photo product and transmit a digital photograph or other image (e.g., via a commercial website, by email, etc.) to personalize that photo product.

The order for the personalized photo product will include customer information, such as the customer's name, address, or other shipping and/or order data. The customer information is used to generate tracking information 225, 230, 235, and 240. In one embodiment, the tracking information 225, 230, 235, and 240 includes a bar code. Alternatively, the tracking information 225, 230, 235, and 240 includes a customer name, a customer address, a number, a quick response (QR) code, other identification or tracking information, or a combination thereof. In one embodiment, the bar code or other tracking information 225, 230, 235, and 240 is associated with customer shipping data, such as a name and address. In one embodiment, the 225, 230, 235, and 240 includes a bin number or location, e.g., to identify a bin to accumulate multiple products ordered by a single customer. Use of a bin number can eliminate the step of scanning or otherwise reading one or more bar codes or other tracking information 225, 230, 235, and 240.

The personalized images 205, 210, 215, and 220 and corresponding label images 225, 230, 235, and 240 are processed to generate a composite image 300. In one embodiment, the position of each personalized image 205, 210, 215, and 220 within the composite image 300 corresponding to a position of a separate photo product 105 on the printer tray 115; and the position of each label image 225, 230, 235, and 240 within the composite image 300 corresponding to a position of a separate label 110 on the printer tray 115. The correspondence between positions within the composite image 300 and items on the printer tray 115 may be calibrated by determining a size ratio or other physical correspondence between the bounds of the composite image 300 and the printer tray 115.

A composite template may be used to generate the composite image. In one embodiment, the composite template is based upon the position correspondence described above and the number of photo products 105 and labels 110 held by a single printer tray 115. A processing device may generate or receive the label images 225, 230, 235, and 240 corresponding to the personalized images 205, 210, 215, and 220 to be printed. The processing device may automatically arrange these images into the template by placing a predetermined number of the personalized images 205, 210, 215, and 220 and label images 225, 230, 235, and 240 into predetermined locations within the template without user input. Once the composite template includes all of the images (e.g., up to a limit of the number of images that it may hold), the composite template may be saved or transmitted as a single image for printing.

Figure 4:
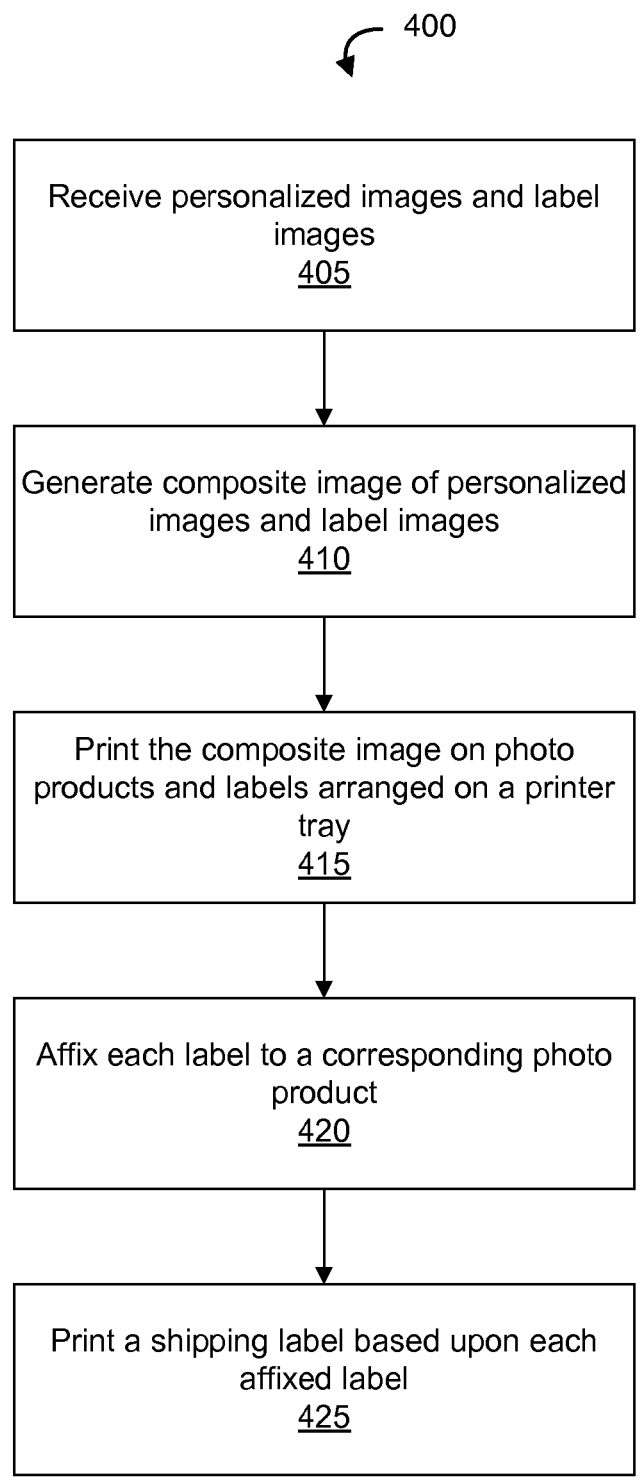
FIG. 4 is a flow chart illustrating a method of printing tracking labels as a part of a composite image of personalized images for photo products according to an embodiment of the invention.

FIG. 4 is a flow chart illustrating a method 400 of printing tracking labels 110 as a part of a composite image 300 of personalized images for photo products 105 according to an embodiment of the invention. At block 405, a processing device receives one or more digital photographs or other personalized images 205, 210, 215, and 220 and customer data. The customer data may be in the form of the label images 225, 230, 235, and 240 described above, or the processing system may generate the label image 225, 230, 235, and 240 from the customer data.

At block 410, the processing device generates a composite image 300 of one or more personalized images 205, 210, 215, and 220 and label images 225, 230, 235, and 240 as described above with reference to FIG. 3. At block 420, the composite image 300 including the personalized images 205, 210, 215, and 220 and label images 225, 230, 235, and 240 is printed onto photo products 105 and labels 110 arranged on a printer tray 115.

At block 420, each printed label 110 is removed and affixed to a neighboring or corresponding photo product 105. For example, a printed label 110 may include a removable surface that exposes an adhesive for temporarily affixing the label 110 to a portion of the corresponding printed photo product 105. Alternatively, the printed label 110 may be affixed to a container (e.g., for storage or shipping) that receives the corresponding printed photo product 105.

At block 425, each printed label 110 is scanned or otherwise read to print a shipping label. The shipping label is affixed to a shipping container that receives the photo product 105.

Figure 5:
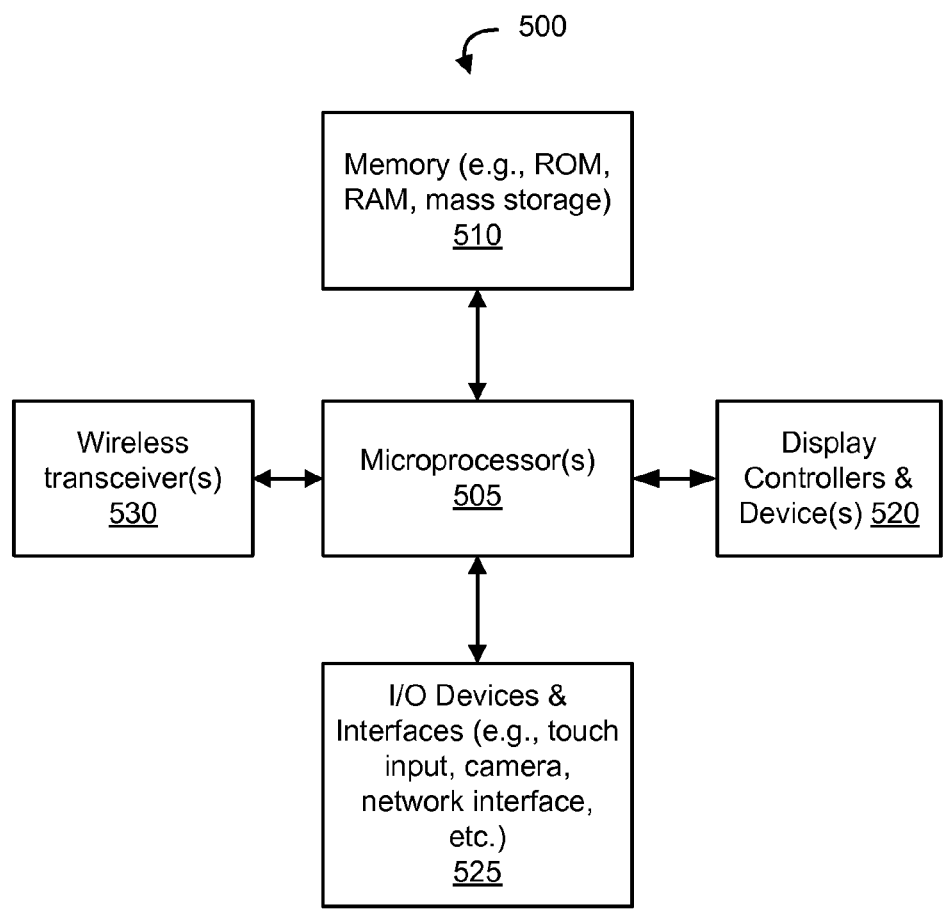
FIG. 5 illustrates, in block diagram form, an exemplary processing system that can print tracking labels as a part of a composite image of personalized images for photo products.

FIG. 5 illustrates, in block diagram form, an exemplary data processing system 500 that can print tracking labels as a part of a composite image of personalized images for photo products, as described herein. Data processing system 500 may include one or more microprocessors 505 and connected system components (e.g., multiple connected chips) or the data processing system 500 may be a system on a chip.

The data processing system 500 includes memory 510 which is coupled to the microprocessor(s) 505. The memory 510 may be used for storing data, metadata, and programs for execution by the microprocessor(s) 505. The memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage.

A display controller and display device 520 provides a visual user interface for the user; this user interface may include a graphical user interface which, for example, is similar to that shown on a computer when running operating system software.

The system 500 also includes one or more input or output ("I/O") devices and interfaces 525 which are provided to allow a user to provide input to, receive output from, and otherwise transfer data to and from the data processing system 500 (e.g., personalized images, tracking information, label images, composite images, printer commands, etc.). These I/O devices may include a mouse, keypad or a keyboard, a touch panel or a multi-touch input panel, camera, network interface, modem, other known I/O devices or a combination of such I/O devices. The I/O devices and interfaces 525 may also include a connector for a dock or a connector for a USB interface, FireWire, Thunderbolt, Ethernet, etc. to connect the system 500 with a network or another device or external component, such as the printer 100 described above.

Data processing system 500 also includes one or more wireless transceivers 530, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 500 with a network or another device or external component, such as the printer 100 described above. Similar to the I/O devices and interfaces 525 above, the wireless transceiver(s) 530 enable the transfer of data to and from the data processing system (e.g., personalized images, tracking information, label images, composite images, printer commands, etc.).

The data processing system 500 may be a personal computer, tablet-style device, a personal digital assistant (PDA), a handheld computer (which may include a cellular telephone), or devices which combine aspects or functions of these devices. In other embodiments, the data processing system 500 may be a network computer or an embedded processing device within another device or consumer electronic product, such as printer 100. As used herein, the terms "computer," "processing device," and "apparatus comprising a processing device" may be used interchangeably with the data processing system 500 and include the above-listed exemplary embodiments.

It will be appreciated that one or more buses, may be used to interconnect the various components shown in FIG. 5. It will be appreciated that additional components, not shown, may also be part of the system 500, and, in certain embodiments, fewer components than that shown in FIG. 5 may also be used in a data processing system 500.

It will be apparent from this description that aspects of the inventions may be embodied, at least in part, in software. That is, the computer-implemented methods may be carried out in a computer system or other data processing system 500 in response to its processor or processing system executing sequences of instructions contained in a memory, such as memory 510 or other machine-readable storage medium. The software may further be transmitted or received over a network (not shown) via a network interface device 525/530. In various embodiments, hardwired circuitry may be used in combination with the software instructions to implement the present embodiments. Thus, the techniques are not limited to any specific combination of hardware circuitry and software, or to any particular source for the instructions executed by the data processing system 500.

In the foregoing specification, the invention has been described with reference to specific exemplary embodiments thereof. It will be evident that various modifications may be made thereto without departing from the broader spirit and scope of the invention. For example, embodiments described herein refer to photo products that receive personalized or unique customer images. Other products that receive printed images, however, may also be printed as described herein. Additionally, while the figures illustrate a photo product in the shape of a star, other photo products, and a corresponding printer tray, may be used in accordance with embodiments of the invention described herein. The specification and drawings are, accordingly, to be regarded in an illustrative sense rather than a restrictive sense.

What is claimed is:

1. A method comprising:
receiving, by a computer, a plurality of personalized images and a plurality of label images, wherein the plurality of personalized images include a first personalized image from a first customer order and a second personalized image from a second customer order, the first customer order differing from the second customer order and the first personalized image differing from the second personalized image, and wherein each label image includes customer order tracking information associated with one of the plurality of personalized images;
generating, by the computer, a composite image including the plurality of personalized images and the plurality of label images, a position of each personalized image within the composite image corresponding to a position of a photo product of a plurality of photo products on a printer tray and a position of each label image within the composite image corresponding to a position of a label of a plurality of labels on the printer tray, wherein each photo product and each label is a separate item held in a respective position by the printer tray; and
printing the composite image onto the plurality of photo products and the plurality of labels on the printer tray, each personalized image printed on a corresponding photo product and each label image printed on a corresponding label.

2. The method of claim 1, further comprising:
affixing each label to a corresponding photo product.

3. The method of claim 1, wherein the order tracking information for each label is a barcode.

4. The method of claim 1, wherein the order tracking information for each label includes a shipping address for a corresponding photo product.

5. The method of claim 1, wherein the order tracking information for each label includes identifies a storage location to hold multiple photo products associated with a single order.

6. The method of claim 2, further comprising:
reading a label affixed to a photo product; and
printing a shipping label including a shipping address associated with the label affixed to the photo product.

7. The method of claim 1, wherein the photo products are arranged in rows on the printer tray, the labels are arranged in rows on the printer tray, and the rows of the photo products alternate with the rows of the labels.

8. A non-transitory machine readable medium storing instructions to cause a processing device to perform a method comprising:

receiving a plurality of personalized images and a plurality of label images, wherein the plurality of personalized images include a first personalized image from a first customer order and a second personalized image from a second customer order, the first customer order differing from the second customer order and the first personalized image differing from the second personalized image, and wherein each label image includes customer order tracking information associated with one of the plurality of personalized images;

generating a composite image including the plurality of personalized images and the plurality of label images, a position of each personalized image within the composite image corresponding to a position of a photo product of a plurality of photo products on a printer tray and a position of each label image within the composite image corresponding to a position of a label of a plurality of labels on the printer tray, wherein each photo product and each label is a separate item held in a respective position by the printer tray; and printing the composite image onto the plurality of photo products and the plurality of labels.

9. The non-transitory machine readable medium of claim 8, wherein each label is removed from the printer tray and affixed to a corresponding photo product.

10. The non-transitory machine readable medium of claim 8, wherein the order tracking information for each label is a barcode.

11. The non-transitory machine readable medium of claim 8, wherein the order tracking information for each label includes a shipping address for a corresponding photo product.

12. The non-transitory machine readable medium of claim 8, wherein the order tracking information for each label includes identifies a storage location to hold multiple photo products associated with a single order.

13. The non-transitory machine readable medium of claim 9, wherein each label affixed to a corresponding photo product is read in order to print a shipping label including a shipping address associated with the label affixed to the corresponding photo product.

14. The non-transitory machine readable medium of claim 8, wherein the photo products are arranged in rows on the printer tray, the labels are arranged in rows on the printer tray, and the rows of the photo products alternate with the rows of the labels.

* * * * *